United States Patent [19]

Frambach, Sr.

[11] Patent Number: 4,502,706
[45] Date of Patent: Mar. 5, 1985

[54] TRACTOR HITCH FRAME

[76] Inventor: James E. Frambach, Sr., Rte. 1, Box 28, Emmetsburg, Iowa 50536

[21] Appl. No.: 469,396

[22] Filed: Feb. 24, 1983

[51] Int. Cl.³ .............................................. B60D 1/10
[52] U.S. Cl. .................................. 280/415 A; 280/510
[58] Field of Search .......... 280/415 R, 415 A, 461 A, 280/435, 508, 510

[56] References Cited

U.S. PATENT DOCUMENTS

| | | | |
|---|---|---|---|
| 2,321,516 | 6/1943 | Robertson | 280/415 A |
| 2,465,641 | 3/1949 | Gardner | 280/415 A |
| 2,482,868 | 9/1949 | Pollard | 280/435 X |
| 3,542,399 | 11/1970 | Myers | 280/415 A |
| 3,716,253 | 2/1973 | Gniffke et al. | 280/415 A |
| 4,343,484 | 8/1982 | Van Antwerp | 280/415 R |

*Primary Examiner*—John A. Pekar
*Attorney, Agent, or Firm*—Harvey B. Jacobson

[57] ABSTRACT

A hexagonal hitch frame is provided including short upper and lower horizontal sides and generally horizontal oppositely outwardly projecting mid-heights arms projected outward from the opposite sides of the frame supported from the opposite side apex portions thereof defined by the intersections between corresponding upper and lower sides of the frame on opposite sides thereof. The short upper side is supportable from the central upper hitch arm of a tractor hitch, the outer ends of the opposite side outwardly projecting arms of the frame are supportable from the lift arms of the tractor hitch and the short lower side of the frame includes a rearwardly projecting hitch coupler shiftable between open and closed positions and equipped a spring biased latch for latching the coupler in a closed position and the short lower frame side also includes hydraulic ram structure for releasing the latch against the spring bias thereof and enabling the hitch coupler to shift to the open position.

2 Claims, 6 Drawing Figures

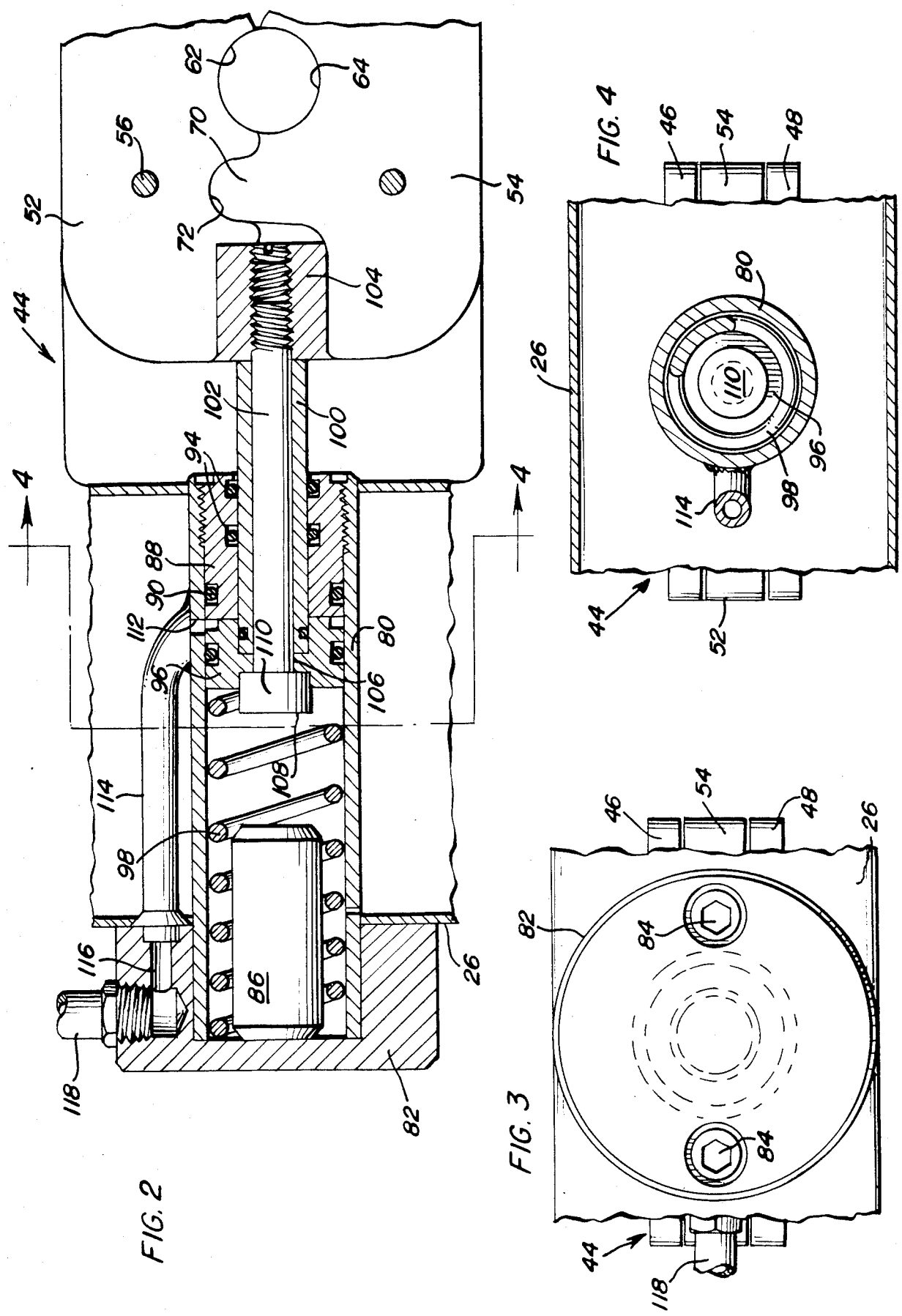

4,502,706

TRACTOR HITCH FRAME

BACKGROUND OF THE INVENTION

In many instances it is desired to trail heavy wagons or implements behind a farm tractor. Further, many farm tractors include lift hitches which do not includes hitch assemblies for trailing heavy implements. Accordingly, a need exists for a hitch frame which may be supported from a lift hitch and includes hitch structure by which a heavy farm implement may be trailed behind the associated tractor.

Also, it is sometimes undesirable for the operator of a tractor to have to dismount therefrom for coupling or uncoupling an implement to be towed or having been towed therebehind. Accordingly, a need exists for a hitch structure which may be automatically engaged with and locked relative to a towing pin portion of an implement to be towed without the operator of a tractor having to dismount therefrom. In addition, it is further desirable to provide a hitch structure which may be remotely opened, either by hydraulic or pneumatic means, by the operator of a tractor and thus result in a further savings of time.

Present day hitch assemblies provided on tractors do not include the above-noted operational features, nor do hitch frames presently being marketed for use on tractor lift hitches.

BRIEF DESCRIPTION OF THE INVENTION

The instant invention includes an upstanding generally hexagonal frame including short upper and lower sides, a pair of horizontally outwardly projecting arms supported from the apex portions of the frame define the intersections between corresponding upper and lower sides of the frame and a hitch assembly supported from the lower or bottom side of the frame. The upper side of frame may be releasably engaged with the center upper arm of a tractor lift hitch and the opposite outwardly projecting arms of the frame may be supported from the rear ends of the lift arms of an associated tractor lift hitch. The hitch assembly supported from the lower side of the frame includes a pair of rearwardly divergent pivotally mounted jaws including opposing recesses and swingable at their rear ends inwardly behind an implement hitch pin for locking the hitch pin within the recesses upon rearward displacement of the hitch assembly relative to the hitch pin. The forward ends of the hitch assembly arms include coextensive notches opening toward each other and into which a locking block may be inserted to lock the hitch assembly arms against pivotal movement from their closed positions toward their open positions. The lock block is supported from the hitch assembly for movement between an inactive forwardly retracted position and a rearwardly displaced active position. The lock block is spring biased toward its active position and has fluid pressure means operatively associated therewith for displacing the lock block from its active position to its inactive position against the biasing action of the spring and the fluid pressure means may be remotely operated from the operator's position of the associated tractor.

The main object of this invention is to provide an improved hitch frame for a lift-type implement hitch of a tractor.

Another object of this invention is to provide a hitch frame including an improved hitch assembly for rating an engagement with and disengagement from the hitch pin of a heavy piece of farm equipment to be trailed behind an associated tractor as the tractor is moved rearwardly toward the hitch pin.

Another very important object of this invention, in accordance with the immediately preceding object, is to provide a hitch assembly of the type which will automatically be locked in the closed position as the hitch assembly is engaged with an implement hitch pin.

Still another object of this invention is to provide a hitch assembly including structure wherein the hitch assembly may be opened from a remote position such as the operator's position of the associated tractor.

A final object of this invention to be specifically enumerated herein is to provide an apparatus in accordance with the proceeding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 an enlarged fragmentary longitudinal vertical sectional view taken substantially upon the plane indicated by the sectional line 2—2 of FIG. 1;

FIG. 3 is a front elevational view of the hitch assembly carried by the lower portion of the hitch frame;

FIG. 4 is a transverse vertical sectional view taken substantially upon the plane indicated by the sectional line 4—4 FIG. 2;

DETAILED DESCRIPTION OF THE INVENTION

Figure 1:
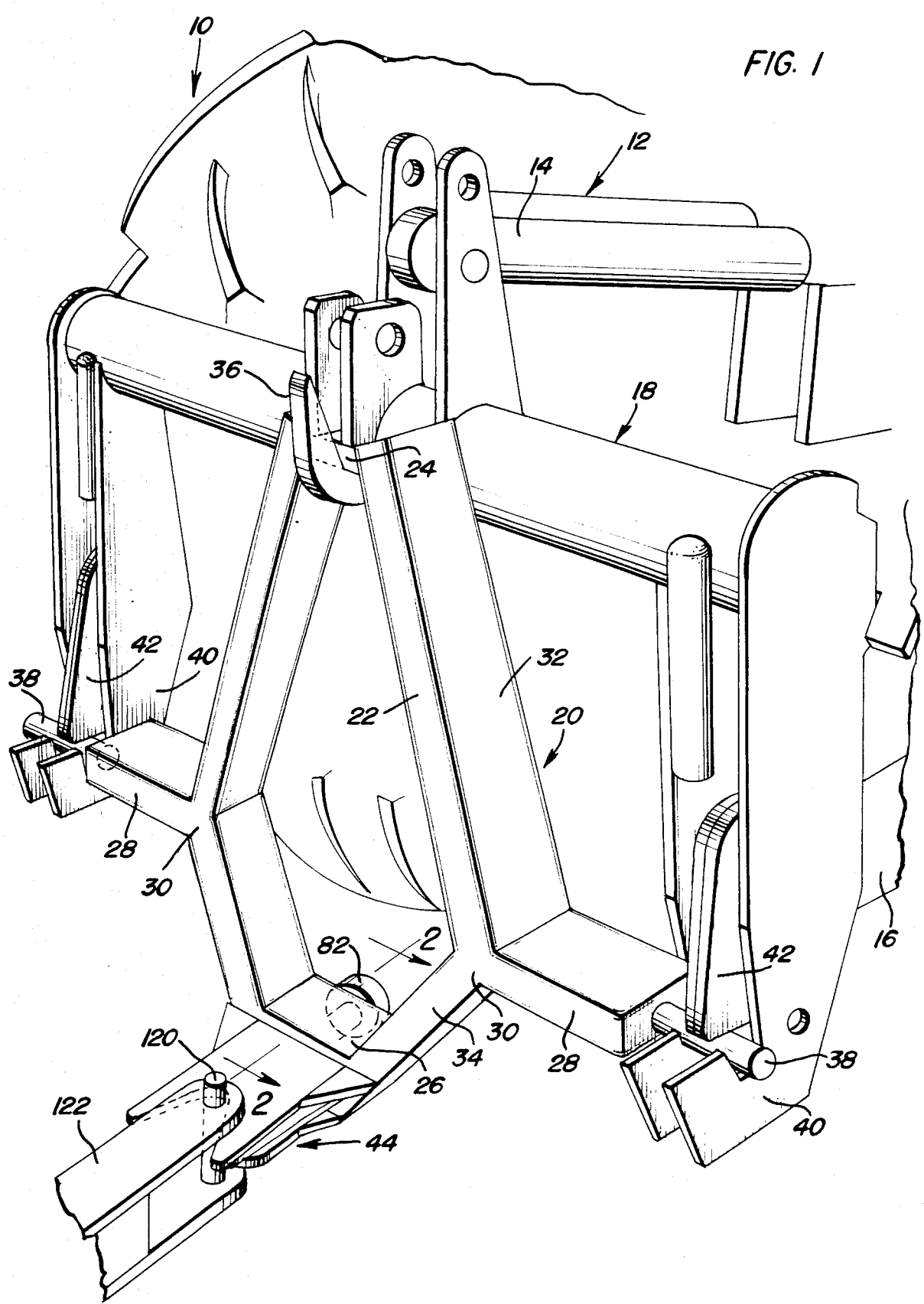
FIG. 1 is a rear perspective view of a hitch frame constructed in accordance with the present invention and including a hitch assembly for engagement with the hitch pin of an implement, the hitch frame being illustrated as supported from a well-known type of tractor lift hitch assembly.
Figure 5:
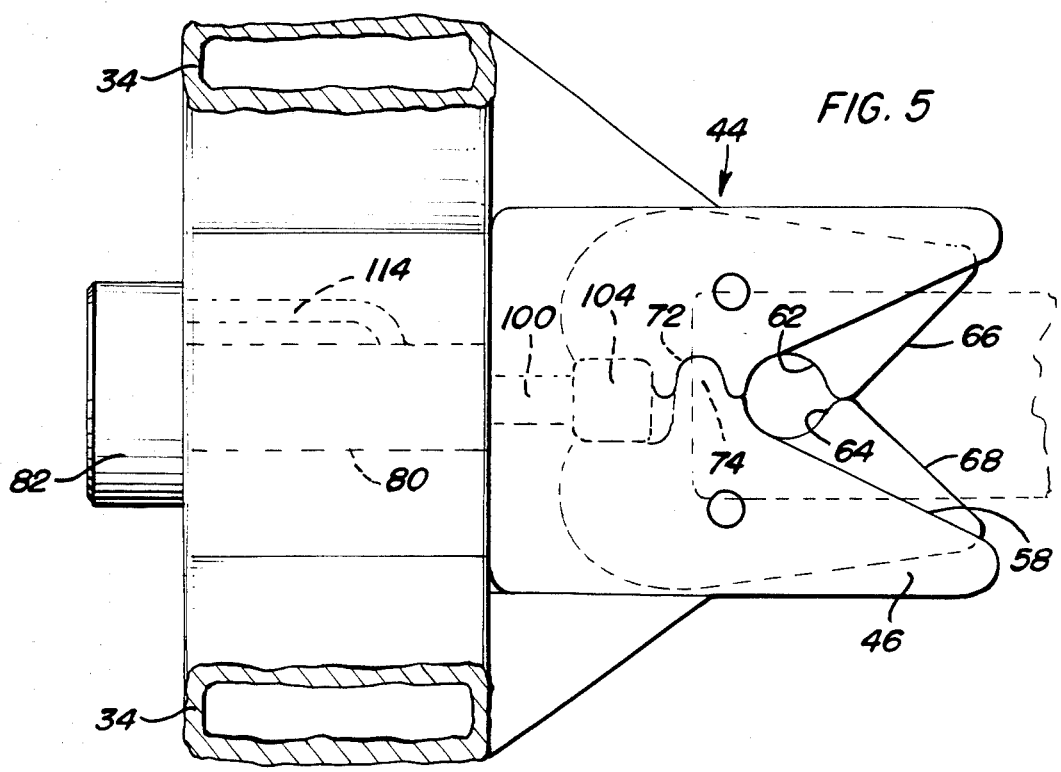
FIG. 5 is an enlarged fragmentary plan view of the lower portion of the hitch frame and the hitch assembly supported therefrom, portions of the hitch frame being broken away and illustrated in horizontal section.

Referring now more specifically to the drawings the numeral 10 generally designates a farm tractor equipped with a controllable hydraulic system (not shown) and a lift hitch assembly referred to in general by the reference numeral 12 which may be operated by the hydraulic system. The lift hitch assembly 12 includes an upper center arm 14 and opposite side lower lift arms 16. A mounting frame referred to in general by the reference numeral 18 is supported from the arms 14 and 16 and is to be considered as conventional.

The hitch frame of the instant invention is referred to in general by the reference numeral 20 and includes a peripherally continuous generally hexagonal upstanding frame 22 including short upper and lower sides 24 and 26 and horizontally outwardly projecting arms 28 supported from the apex portions 30 of the frame 12 defining the intersections between corresponding upper and lower sides 32 and 34 of the frame 22. The upper side 24 is removably supported from a hook portion 36 of the frame 18 and the outer ends of the arms 28 include outwardly projecting shank portions 38 which are releasably lockingly received within suitable lower opposite side mounting structures 40 carried by the frame 18. Of course, the mounting structures 40 include latch portions 42 which may be forwardly retracted in order to enable upward withdrawal of the shank portions 38 of the frame 22 from the mounting structures 40. This of course also will enable the upper short horizontal side 24 of the frame 22 to be upwardly displaced relative to and disengaged from the hook portion 36 of the frame 18.

It will be noted that the lower side 26 is spaced below the plane containing the horizontal center axis of the arms 28 less than one-half the distance the upper side 24 of the frame 22 is spaced above the same plane. The lower side 26 supports a hitch assembly therefrom referred to in general by the reference numeral 44 and the hitch assembly 44 may be used to trail heavy equipment behind the tractor 10, the minimal spacing of the lower side 26 below the elevation of the shank portions 38 provides for a secure mounting of the hitch frame 20 from the frame 18 and an even distribution of towing forces transmitted through the hitch assembly 44.

Figure 6:
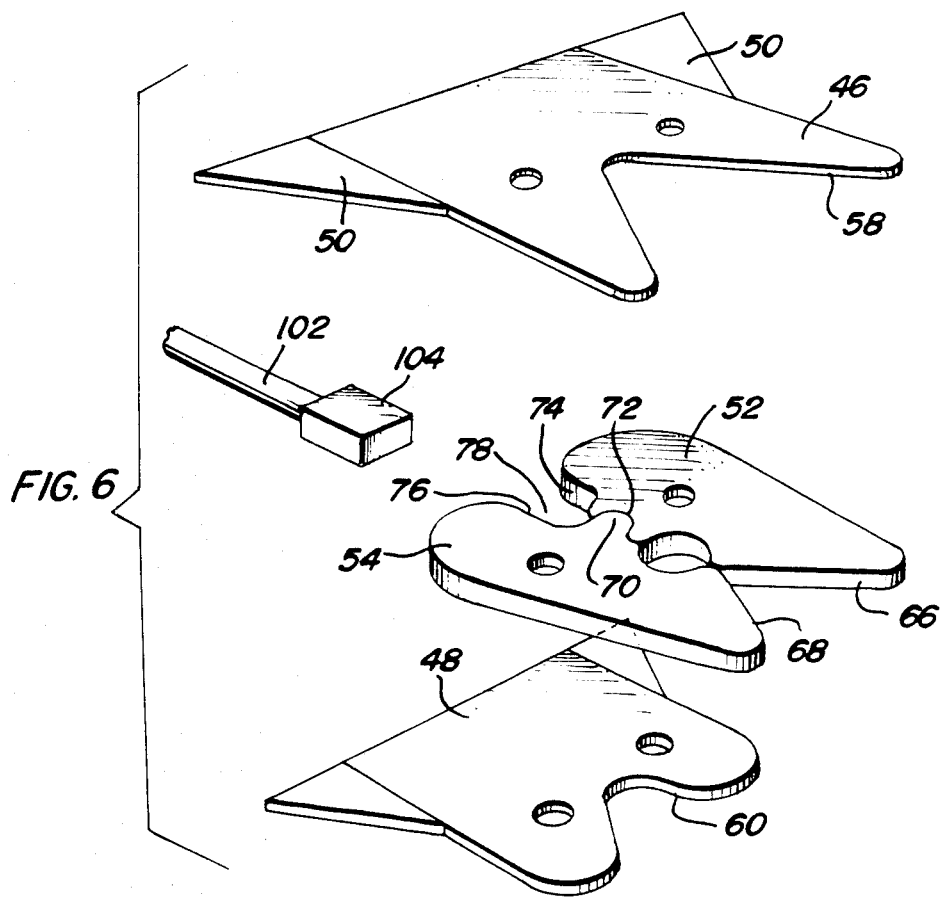
FIG. 6 is an exploded perspective view of the hitch assembly.

With attention now invited more specifically to FIGS. 1, 2 and 6 of the drawings, it may be seen that the hitch assembly 44 includes upper and lower rearwardly projecting plates 46 and 48 supported from the lower side 26 of the frame 22. The plates 46 and 48 include buttresses 50 on the opposite sides thereof and a pair of jaws 52 and 54 are pivotally anchored between the plates 46 and 48 by suitable pivot fasteners 56. The plates 46 and 48 define rearwardly opening notches 58 and 60 and the forward ends of the jaws 52 and 54 define opposing semicirclar recesses 62 and 64 as well as rearwardly divergent cam surfaces 66 and 68. In addition, the mid-portion of the jaw 54 includes a lug 70 meshed in a recess 72 formed in the opposing portion of the jaw 52 and the forward ends of the jaw 52 and 54 include coextensive notches 74 and 76 which open toward each other and forwardly of the jaws 52 and 54 to define a central rearwardly opening recess 78.

With attention now invited more specifically to FIG. 2, it may be seen that the lower side 26 is hollow and has a front to rear extending horizontal cylinder defining sleeve 80 secured therethrough. The forward end of the sleeve 80 projects forwardly of the side 26 and has an end cap 82 secured thereover and to the side 26 through the utilization of suitable fasteners 84. The end cap 82 supports a centrally inwardly projecting abutment 86 therefrom.

The rear end of the sleeve 80 includes an end plug 88 removably threadily received therein and equipped with an inner end annular seal 90 and the end plug 88 defines a bore 92 therethrough equipped with internal seal rings 94. A piston 96 is slidable within the sleeve 80 between the end plug 88 and the abutment 86 and a compression spring 98 is disposed about the abutment 86 between the closed end of the cap 82 and the piston 96. The piston 96 includes a piston shaft sleeve 100 supported therefrom and through which a bolt 102 securing the piston 96 to the sleeve 100 is secured by a locking block 104 threadingly engaged with the rear end of the bolt 102, the forward end of the bolt 102 passing through a bore 106 formed through the piston 96 and equipped with a counter bore 108 in which the head 110 of the bolt 102 is seated. The locking block 104 is spring biased rearwardly toward a position seated fully with the recess 78. When the locking block 104 is disposed within the recess 78 the forward ends of the jaws 52 and 54 may not swing toward each other and, therefore, the rear ends of the jaws 52 may not swing apart. The lug 70 and recess 72 interlock the jaws 52 and 54 together for equal and inverse oscillation relative to the plates 46 and 48 and the sleeve 80 includes a lateral port 112 to which one of the a fluid pressure pipe 114 is connected. The fluid pressure pipe 114 opens forwardly into one end of an L-shaped passage 116 formed in the end cap 82 and a fluid pressure supply line 118 is threaded into the end of the passage 116.

The spring 98 serves to rearwardly bias the piston 96 and thus the lock block 104 into seated position within the recess 78. When fluid pressure, either hydraulic or air, is applied to the supply line the resultant pressure within the sleeve 80 rearwardly of the piston 96 forwardly displaces the piston 96 within the sleeve 80 against the biasing action of the spring 98 and thus retracts the lock block 104 forwardly out of the recess 78. As soon as the lock block has been retracted forwardly from the recess 78, the jaws 52 and 54 are free to swing apart at their rear ends in order to receive the hitch pin 120 of a farm implement 122 therebetween. As the hitch assembly 44 is rearwardly advanced against the hitch pin 120, the hitch pin 120 abuts against the portions of the recesses 62 and 64 adjacent the recess 72 and the lug 70 and thereby swings those portions of the jaws 52 and 54 rearwardly in order to cause angular displacement of the jaws 52 and 54 such that the rear ends thereof swing together to the closed positions illustrated in FIG. 6 wherein the pin 120 is closely embraced with the recesses 62 and 64. Then, the hydraulic pressure previously utilized to forwardly displace the piston 96 within the sleeve 80 to a position with the head 110 abutted against the abutment 86 is released and the biasing action of the spring 98 rearwardly displaces the piston 96 and thus lock block 104 into position fully seated within recess 78 thereby locking the jaws 52 and 54 against angular displacement to positions with the rear ends thereof swung apart. In this manner, the hitch pin 120 is prevented from disengagement. Inasmuch as the hydraulic or air pressure supplied to and relieved from the supply line 118 is under the control of the operator of the tractor 10, a hitching and unhitching operation may be fully carried out by the operator of the tractor 10 without leaving the operator's position.

The hitch frame 20 is of open configuration to allow the power take off of the tractor 10 to be used with the power take off shaft (not shown) extending rearwardly through the frame 20 above the hitch assembly 44.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A hitch assembly including a mounting portion having front and rear sides, a pair of front to rear extending jaws pivotally supported from said mounting portion for oscillation about laterally spaced axes, said jaws, forward of said axes defining coextensive notches opening forwardly and laterally toward each other, said levers, rearward of said axes, including registered generally semicircular recesses opening toward each other and adapted to embracingly engage one-half of the periphery of an associated hitch pin, said levers, intermediate said front and rear ends including means interconnecting said levers for substantially equal inverse oscillation, and a lock block shiftably supported from said mounting portion for movement into and out of a position received in said notches, said lock block, when disposed in said notches preventing swinging movement of the rear ends of said jaws away from each other and thus enabling said jaws to captively retain a hitch pin in said recesses, said mounting portion including vertically spaced upper and lower rearwardly projecting horizontal plates between which said jaws are pivotally mounted and a front-to-rear extending cylinder mounted therefrom forward of said notches, an end wall closing the rear end of said cylinder, front-to-rear extending elongated shank means sealingly and slidably received centrally through said end wall, said locking block being mounted on the rear end of said shank means, a piston slidably in said cylinder and mounted on the front end of said shank means, closure means closing the front end of said cylinder, coiled compression spring means disposed within said cylinder between said closure means and said piston yieldingly biasing the latter rearwardly toward said end wall to thus rearwardly project said shank means and lock block toward a position with said lock block seated in said notches, abutment means in said cylinder supported from said closure means and projecting toward said piston within the confines of said spring, said abutment means limiting forward displacement of said piston in said cylinder and thus compression of said spring, and fluid pressure ingress and egress means opening into said cylinder closely forward of said end wall.

2. The hitch assembly of claim 1 including an upstanding generally hexagonal frame incorporating horizontally short upper and lower sides, a pair of oppositely horizontally outwardly projecting arms supported from said frame at the intersections between corresponding upper and lower sides of said frame, said upper side and said arms including means for support from the upper central arm of the lift hitch assembly and the lower opposite side lift arms of the lift hitch assembly, said mounting portion comprising said lower side of said frame.

* * * * *